United States Patent
Doshi et al.

(10) Patent No.: US 6,529,499 B1
(45) Date of Patent: Mar. 4, 2003

(54) METHOD FOR PROVIDING QUALITY OF SERVICE FOR DELAY SENSITIVE TRAFFIC OVER IP NETWORKS

(75) Inventors: Bharat Tarachand Doshi, Holmdel, NJ (US); Enrique Hernandez-Valencia, Highlands, NJ (US); Kotikalapudi Sriram, Marlboro, NJ (US); Yung-Terng Wang, Marlboro, MA (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/158,694

(22) Filed: Sep. 22, 1998

(51) Int. Cl.[7] ............................ H04L 12/66; H04L 12/26

(52) U.S. Cl. ...................... 370/352; 370/230; 370/468

(58) Field of Search ............................ 370/351–356, 370/400–402, 229–238.1, 522–524, 395.2, 395.21, 395.41, 395.52, 468; 709/223–229; 320/209

(56) References Cited

U.S. PATENT DOCUMENTS

| | | | | |
|---|---|---|---|---|
| 4,914,650 | A | | 4/1990 | Sriram ........................ 370/60 |
| 5,434,852 | A | * | 7/1995 | La Porta et al. ............. 370/524 |
| 5,463,620 | A | | 10/1995 | Sriram ........................ 370/60 |
| 5,732,078 | A | * | 3/1998 | Arango ....................... 370/355 |
| 5,751,712 | A | * | 5/1998 | Farwell et al. .............. 370/431 |
| 6,064,653 | A | * | 5/2000 | Farris ......................... 370/352 |
| 6,078,582 | A | * | 6/2000 | Curry et al. ................. 370/352 |
| 6,094,431 | A | * | 7/2000 | Yamato et al. ........ 370/395.21 |
| 6,097,722 | A | * | 8/2000 | Graham et al. ....... 370/395.21 |
| 6,205,211 | B1 | * | 3/2001 | Thomas et al. ............. 379/125 |
| 6,292,478 | B1 | * | 9/2001 | Farris ......................... 370/352 |

FOREIGN PATENT DOCUMENTS

GB 2317 308 A 3/1998 .......... H04L/12/46

OTHER PUBLICATIONS

"A New ATM Adaptation Layer for Small Packet Encapsulation and Multiplexing"; John H. Baldwin, Behram H. Bharucha, Bharat T. Doshi, Subrahmanyam Dravida and Sanjiv Nanda; Bell Labs Technical Journal, vol. 2, No. 2, Spring 1997.

(List continued on next page.)

Primary Examiner—Steven Nguyen
(74) Attorney, Agent, or Firm—Troutman, Sanders, Mays & Valentine

(57) ABSTRACT

A quality of service guarantee for voice and other delay sensitive transmissions within an Internet Protocol (IP) network is provided by identifying the IP network path utilized for IP packet transmission between source and destination edge devices and virtually provisioning IP network path bandwidth for priority voice traffic. Priority for voice packets and admission control of new voice calls (and other delay sensitive traffic) based on the remaining available capacity over the IP network path guarantees that high priority voice (and other delay sensitive traffic) meet stringent delay requirements. A Virtual Provisioning Server is utilized to maintain bandwidth capacity data for each path segment within the IP network and to forward the bandwidth capacity data to a Signaling Gateway. The Signaling Gateway determines whether to accept or reject an additional delay sensitive traffic component based upon available bandwidth capacity for an IP network path. The Signaling Gateway then signals the originating source edge device as to its determination to accept or reject. Quality of Service guarantees concerning acceptable delay and jitter characteristics for real-time transmission over an IP network are therefore provided without the need to directly signal the individual IP routers over which an IP network path is established.

20 Claims, 5 Drawing Sheets

OTHER PUBLICATIONS

"Voice of ATM Using AAL 2 and Bit Dropping: Performance and Call Admission Control", Kotikalapudi Sriram and Yung–Terng Wang; Proceedings of the IEEE ATM Workshop, pp. 215–224, 1998.

"Anomalies Due to Delay and Loss in AAL2 Packet Voice Systems: Performance Models and Methods of Mitigation"; Kotikalapudi Sriram, Terry G. Lyons and Yung–Terng Wang; INFORMS Telecommun. Conf., Boca Raton, Fl. Mar. 8–11, 1998.

Kostas, T.J., et al., "Real–Time Voice Over Packet–Switched Networks", IEEE Network: The Magazine of Computer Communications, US, IEEE Inc., New York, vol. 12, No. 1, Jan. 1, 1998, pp. 18–27.

White, P.P. "RSVP and Integrated Services in the Internet: A Tutorial" IEEE Communications Magazine, US, IEEE Service Center, Piscataway, NJ, vol. 35, No. 5, May 1, 1997, pp. 100–106.

* cited by examiner

METHOD FOR PROVIDING QUALITY OF SERVICE FOR DELAY SENSITIVE TRAFFIC OVER IP NETWORKS

FIELD OF THE INVENTION

The present invention relates to the field of Internet Protocol (IP) networks, and more particularly to the transport of delay sensitive traffic over IP networks.

BACKGROUND OF THE INVENTION

A global network infrastructure for voice services, using a circuit-switching methodology, is supported by Public Switched Telephone and Private Branch Exchange networks. These networks utilize signaling to establish call connections and routing maps at network switches. The ability to signal during call connection set-up provides individual switches with the capability to reject call connection requests when that individual switch does not have the available bandwidth to support a new call connection. Since any switch in a connection path may reject a new call connection request based on available bandwidth limitations, switched voice networks are able to provide guaranteed Quality of Service to established connections. Quality of Service in switched voice networks is guaranteed because the governing precept is that it is preferable to block new call connection attempts rather than allow a new connected call to degrade the performance of established connected calls.

Explosive growth in Internet Protocol (IP) based Intranets and public Internet has generated a large network infrastructure of IP based routers. Recently, this large IP network infrastructure has begun to be utilized as a vehicle for real-time transmission of voice over the Internet, also known as Internet telephony. Each year, Internet telephony captures a greater share of the telephony market. However, unlike the case of switched voice service networks, routers contained within IP networks are not signaled. Since signaling between source, destination, and intermediate routers is not provided within IP networks, new calls can not be rejected at the IP routers, even if the routers are burdened beyond their respective bandwidth capacities. Therefore, real-time transmission over the Internet is subject to levels of delay and jitter not associated with Public Switched Telephone Networks and Private Branch Exchanges. Rather, transmission over the Internet and other IP networks is accomplished via a best effort transmission mode. Consequently, telephony over IP networks does not currently provide a Quality of Service guarantee for voice and other delay sensitive transmissions.

SUMMARY OF THE INVENTION

A quality of service guarantee for voice and other delay sensitive transmissions within an Internet Protocol (IP) network is provided by identifying the IP network path utilized for IP packet transmission between source and destination edge devices and virtually provisioning IP network path bandwidth for priority voice traffic. Priority for voice packets and admission control of new voice calls (and other delay sensitive traffic) based on the remaining available capacity over the IP network path guarantees that high priority voice (and other delay sensitive traffic) meet stringent delay requirements. A Virtual Provisioning Server is utilized to maintain bandwidth capacity data for each path segment within the IP network and to forward the bandwidth capacity data to a Signaling Gateway. The Signaling Gateway determines whether to accept or reject an additional delay sensitive traffic component based upon available bandwidth capacity for an IP network path. The Signaling Gateway then signals the originating source edge device as to its determination to accept or reject. Quality of Service guarantees concerning acceptable delay and jitter characteristics for real-time transmission over an IP network are therefore provided without the need to directly signal the individual IP routers over which an IP network path is established.

BRIEF DESCRIPTION OF THE DRAWINGS

A more complete understanding of the present invention may be obtained from consideration of the following description in conjunction with the drawings in which.

DETAILED DESCRIPTION

Figure 1:
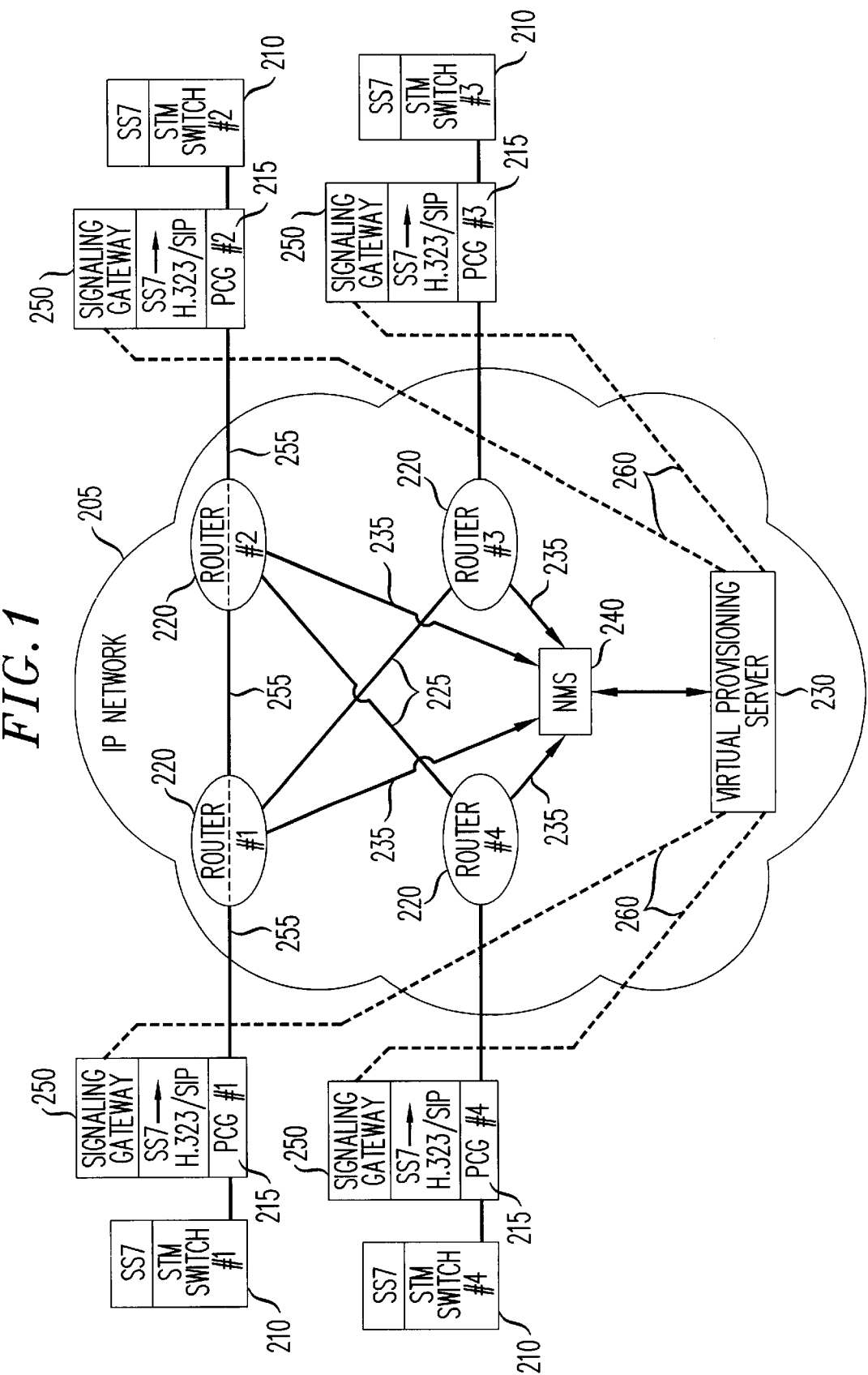
FIG. 1 is a diagram illustrating a voice over IP network between Packet Circuit Gateway edge devices and incorporating a Virtual Provisioning Server, the Virtual Provisioning Server communicating with a plurality of Signaling Gateways, in accordance with an exemplary embodiment of the present invention.
Figure 2:
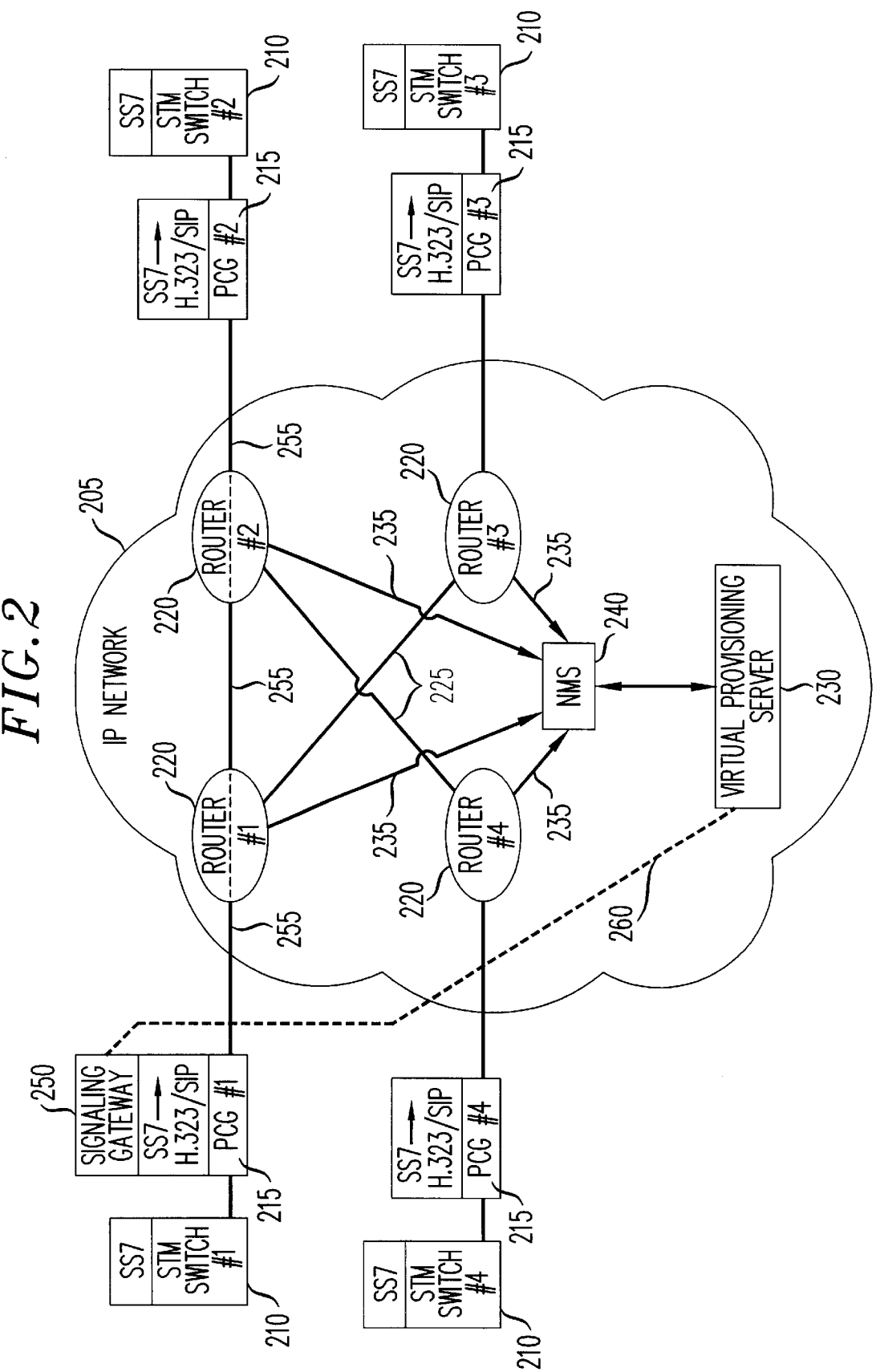
FIG. 2 is a diagram illustrating a voice over IP network between Packet Circuit Gateway edge devices and incorporating a Virtual Provisioning Server, the Virtual Provisioning Server communicating with a Signaling Gateway co-located with one Packet Circuit Gateway, and providing Signaling Gateway functionality to more than one Packet Circuit Gateway 215 within the network, in accordance with an exemplary embodiment of the present invention.
Figure 3:
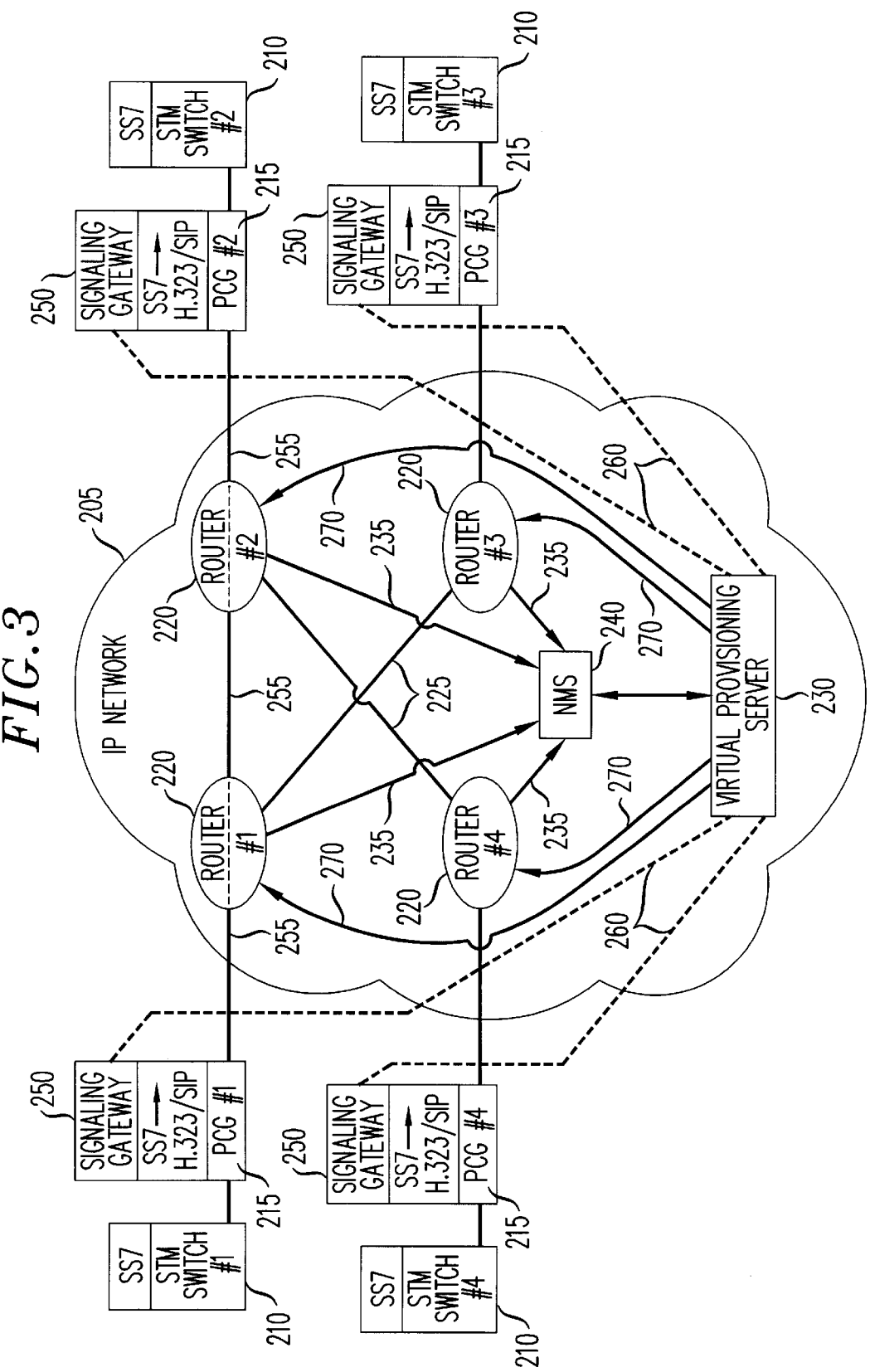
FIG. 3 is a diagram illustrating a voice over IP network between Packet Circuit Gateway edge devices and incorporating a Virtual Provisioning Server, the Virtual Provisioning Server further performing functions as a Virtual Private Network (VPN) Resource Manager, in accordance with an exemplary embodiment of the present invention.

FIGS. 1, 2, and 3 are diagrams illustrating various embodiments for IP networks 205 between Packet Circuit Gateway edge devices 215 incorporating a Virtual Provisioning Server 230, in accordance with the present invention. In FIG. 1, the Virtual Provisioning Server 230 communicates with a Signaling Gateway 250 associated with each Packet Circuit Gateway edge device 215. In FIG. 2, the Virtual Provisioning Server 230 communicates with a Signaling Gateway 250 co-located with one Packet Circuit Gateway 215, and providing Signaling Gateway functionality to more than one Packet Circuit Gateway 215 within the network. In FIG. 3, the Virtual Provisioning Server 230 performs additional functions as a Virtual Private Network Resource Manager.

The present invention is described as being utilized within an environment wherein voice traffic originates and terminates on regular Public Switched Telephone Network circuit switches, such as Synchronous Transfer Mode switches 210, and is carried over paths between routers within an IP network 205. However, these circuit switches may also be implemented as simple access multiplexers or edge vehicles as would be apparent to those skilled in the art. It would also be apparent to those skilled in the art that the present invention may be practiced with any IP datagram traffic (in addition to voice), although the present invention provides the greatest benefit for the transport of delay sensitive IP datagram traffic. Conversion from a circuit signal to IP format occurs at Packet Circuit Gateways (PCGs) 215, which are also alternatively known as Service Access Concentrators (SACs) or Internet Telephone Gateways. In addition to conversion between circuit and IP formats, Packet Circuit Gateways 215 also provide voice compression/decompression, silence suppression/insertion, and other well known functions needed for specific applications.

Signaling Gateways 250 are utilized to provide the appropriate interface and interworking between signaling mechanisms and also to determine acceptance or rejection of a new call request originating from an associated Packet Circuit Gateway. Circuit networks, such as Public Switched Telephone Networks, typically use Signaling System 7 (SS7) to communicate requests for connection set-up and tear down. IP endpoints and intermediate routers use ITU-T H.323 or Session Initiation Protocol (SIP) for session management. Therefore, Signaling Gateways 250 provide a higher layer protocol utilized at the Packet Circuit Gateways 215 to facilitate conversions in signaling mechanisms between Public Switched Telephone Networks and IP networks 205. It should be noted that a resident Signaling Gateway 250 is not required at each Packet Circuit Gateway Rather, the Signaling Gateway function may be implemented at a single location for all Packet Circuit Gateways with control signals transmitted to corresponding Packet Circuit Gateways from the single Signaling Gateway. For example, FIGS. 1 and 3 illustrate embodiments of the present invention wherein each Packet Circuit Gateway 215 maintains a resident Signaling Gateway 250. However, FIG. 2 illustrates an embodiment of the present invention wherein only PCG #1 maintains a resident Signaling Gateway 250. The Signaling Gateway functions are provided at PCG#2, PCG#3, and PCG#4 by transmission of appropriate control signals between the Signaling Gateway resident at PCG#1 and the remaining Packet Circuit Gateways. Transmission may be over the serviced IP network 205 within a TCP/IP session, an adjunct transmission medium, or any other well known means for data transport.

One unique feature of the present invention is provided by a Virtual Provisioning Server 230. The Virtual Provisioning Server is utilized to provide the Signaling Gateways 250 with network bandwidth capability information, so that the Signaling Gateways are able to make a determination as to whether to accept or reject a new call request at an associated Packet Circuit Gateway 215. The basis for admission/denial decisions for new calls is made in order to provide assurances that Quality of Service characteristics, such as delay, jitter, and loss of call connections, are maintained below a guaranteed threshold for established voice call connections.

The Virtual Provisioning Server 230 communicates the network bandwidth capability information to the Signaling Gateways 250 at least once at the commencement of network operation, and episodically whenever the underlying IP network is subject to changes to its link bandwidths due to link failures, new link establishment, addition of bandwidth to existing links, etc. A Network Management System (NMS) is typically associated with an IP network and its functions well known in the art. However, in association with the present invention the Network Management System performs the additional function of apprising the Virtual Provisioning Server of any changes to the link bandwidths as enunciated above.

FIGS. 1–3 illustrate a network path 255 for the transport of IP packets between PCG#1 and PCG#2. The path 255 is via intermediate components Router #1 and Router #2. Routers 220 are interconnected at the physical layer within the IP network 205 by a plurality of physical layer router transport segments 225. It is over a plurality of these physical layer router transport segments 225 that the illustrated network path 255 is established. A network path 255 is comprised of a plurality of path links established over the plurality of physical layer router transport segments 225. The Virtual Provisioning Server 230, in cooperation with the Public Switched Telephone Network provisioning mechanism and admission control implemented by the Signaling Gateway 250, provides for a quality guarantee to voice traffic while allowing the remaining capacity in the IP network to be used by other traffic utilizing the well known best effort mode. Similar provisioning can extend the service guarantee to multiple classes of traffic, for example—video conferencing.

Given that specific STM switches 210 are tied to corresponding Packet Circuit Gateways 215, voice call transport capacity can be easily predicted using standard traffic engineering methods to determine the capacity needed between Packet Circuit Gateways 215. Specific format variables, such as the type of compression method used, the silence suppression capability, etc., determine the network path bandwidth requirements between each pair of Packet Circuit Gateways 215. The Virtual Provisioning Server 230 maintains and manages data corresponding to the transmission capacities of the IP network routers 220 and the physical layer router transport segments 225 between those routers 220. The Virtual Provisioning Server is used, in accordance with the present invention, to determine the capacity requirements over each path between IP network routers 220 to meet the needed bandwidth requirements between Packet Circuit Gateways 215. The capacity requirements over each network element, such as routers 220 and physical layer router transport segments 225 are virtually provisioned within available bandwidth capacity for delay sensitive traffic requirements. In accordance with the present invention, the bandwidth is considered virtually provisioned since the admission/denial of new connected calls is not controlled at each individual router 220, but rather at the Packet Circuit Gateway edge devices 215. Remaining bandwidth capacity over network elements is made available to delay insensitive packet transport only after the provisioning of bandwidth for delay sensitive voice frames or IP packets at the Packet Circuit Gateways 215 is performed. Alternatively, a provisioned minimum bandwidth capacity over each IP network path may be reserved for delay insensitive traffic, with the remaining bandwidth allocated for use by delay sensitive traffic. A Type-of-Service (TOS) field in the IP packet header is utilized to distinguish between delay sensitive and delay tolerant traffic types. Thus, voice packets may be given priority over data packets to ensure that delay and packet loss is in accordance with Quality of Service requirements.

If IP network routers 220 and physical layer router transport segments 225 utilized for a specific path 255 do not have the necessary bandwidth capacity to meet determined capacity requirements, the Virtual Provisioning Server 230 allocates portions of the bottleneck capacity to the pairs of Packet Circuit Gateways 215 competing for this capacity and messages the associated Signaling Gateway 250 of this allocation. The Virtual Provisioning Server 230 also calculates the need for added capacity within the IP network 205 to meet current and future bandwidth needs. By centrally calculating and determining required network bandwidth provisioning and messaging the Signaling Gateways 205 within the IP network 205 of the bandwidth allocation, the Virtual Provisioning Server 230 determines the maximum number of voice calls that can be supported simultaneously between any pair of Packet Circuit Gateways 215. Since Signaling Gateways 250 provide the signaling interworking between SS7 and H.323/SIP, they are also able to track the number of connected calls in progress between pairs of Packet Circuit Gateways 215. As shown in the embodiment of the present invention illustrated in FIG. 2, and as previously described, one Signaling Gateway 250 may be utilized to control more than one Packet Circuit Gateway 215 and may also be utilized to track the number of connected calls in progress between other network Packet Circuit Gateways 215 (PCG #2, PCG #3, and PCG #4 in the instant embodiment as illustrated in FIG. 2).

As previously described, the Virtual Provisioning Server 230 also exchanges data with a Network Management System (NMS) 240. The Network Management System is a well known network controller used to maintain IP network 205 information pertaining to network element capacities, network bandwidth and capacity demand and growth data, link failures, etc. The Network Management System 240 is operable to exchange messages and signals with network routers 220 and to provide and maintain this network information via signaling channels 235. However, the Network Management System 240 does not determine or control admission/denial decisions for new call connections at the Packet Circuit Gateways 215. The Network Management System 240 provides the Virtual Provisioning Server 230 with information about the IP network 205 topology, capacities, failure events, etc. The Virtual Provisioning Server 230 uses this information to update its calculations and signals the Network Management System 240 if changes need to be implemented within the IP network, such as updating routing algorithm weights. Routing algorithm weights are used to determine the routing path for forwarding an IP packet. The use and implementation of such routing algorithm weights is well known in the art of IP networking. When needed capacities cannot be achieved temporarily due to failure events, the Virtual Provisioning Server 230 determines the maximum number of calls that can be supported on affected paths throughout the network and informs the associated Signaling Gateways 250, thereby providing a mechanism to throttle the number of connected calls at the various network Packet Circuit Gateway edge devices 215.

Although the instant embodiment of the present invention is described in the context of connectivity between PSTN switches and Signaling Gateways 250 to manage signaling conversion and admission control, it may also be used to support telephony between PCs and telephony between a PC and a phone via a PSTN switch. In order to guarantee connection quality for these connections, it is important to provide messaging from the Virtual Provisioning Server 230 to the Signaling Gateway 250, thus informing the Signaling Gateway about the call capacities for PCG-to-PCG paths for a minimum of telephony traffic originating from PSTN and PCs. In addition, since a network operator may not control the coding rate in this case (i.e.—when calls originate from PCs), a traffic policing function is utilized at the PCG to monitor compliance with the traffic assumptions used in call set-up signaling.

Voice calls originating from a PC may be assigned lower priority as compared to those originating from a PSTN. Doing so allows the Signaling Gateway 250 to reject PC originated calls based on a lower bandwidth utilization, and rejects the PSTN originated calls at a higher threshold. Therefore, the Signaling Gateway 250 can guarantee call connection quality for voice and other Quality of Service sensitive services by enforcing call admission control at the Packet Circuit Gateways 230 and preferentially awarding priority for PSTN originated voice services over other services. In addition, a service provider may provide a plurality of critical service guarantees to customers and similarly, multiple customers may desire similar critical service guarantees over common paths within an IP network 205. One such example is presented within the context of Virtual Private Networks for voice traffic, wherein a network provider provides wide area services to interconnect corporate users in different locations. The ability to provide multiple Virtual Private Networks along with public service over a common infrastructure is attractive to both the service provider and corporate customers. One critical benefit of providing a Virtual Private Network is that the service provider is able to deliver secure access to the user. A second benefit is the ability to provide a Quality of Service guarantee comparable to that on leased private lines between customer premises switches (e.g., PBXs).

Virtual Private Network customers negotiate bandwidth and service quality guarantees from a wide area network operator or service provider. The network operator guarantees this negotiated service level to all Virtual Private Network customers by utilizing the common infrastructure to achieve multiplexing gain. Capabilities available in currently available routers 220 allow the Virtual Provisioning Server 230 to provide these guaranteed services. For example, routers are available which are capable of identifying flows based on the port, source, and destination identifiers, and which categorize group flows into classes and/or super classes according to the level of service and bandwidth guarantees negotiated. These routers are also operable to allocate and manage minimum and maximum bandwidth for each class, super class, etc. Incorporation of buffer and queue management at the routers provides distinction and differentiation of priority treatment among flow classes and super classes. Additionally, statistical multiplexing may be provided for flows within a class and/or among classes within a super class. A system of Weighted Fair Queuing (WFQ) service provides for management of flow, class, and super class bandwidths. If one of the classes or super classes exceeds a negotiated bandwidth allocation, superior service quality may still be provided if the other negotiated classes or super classes are not completely utilizing their allocated bandwidth. Therefore, only the Quality of Service provided to classes or super classes exceeding their negotiated allocation of bandwidth are affected.

Referring to FIG. 3, the Virtual Provisioning Server 230 is utilized as a Virtual Private Network Resource Manager. The Virtual Private Network Resource Manager utilizes optimizing algorithms to (i) partition bandwidth between Virtual Private Networks and within Virtual Private Networks if the customer desires a further subclassification of services and (ii) control flow routing within the network. If the network routers 220 utilized have flow partitioning capability, but do not have flexible routing capability, then flow routes are fixed through the IP network 205 and capacities are partitioned in the network by the Virtual Private Network Resource Manager based upon the negotiated Virtual Private Network contract. The Virtual Provisioning Server 230, functioning as a Virtual Private Network Resource Manager, sends this partitioning information to individual routers 220 within the network 205 so that the network routers 220 are able to set algorithm weights, minimum bandwidth, maximum bandwidth, buffer thresholds, etc. Communication between the Virtual Private Network Resource Manager is illustrated over a VPN signaling path 270 between the Virtual Provisioning Server 230 and individual routers, in accordance with FIG. 3. The illustrated VPN signaling path 270 is merely illustrative, and any number of other means for signaling routers 220 would also be apparent to those skilled in the art, including communicating through the Network Management System 240. Once partitioning information is received at network routers 220 and partitioning is accomplished, each Virtual Private Network is established with its allocated minimum bandwidth.

Referring again to FIGS. 1–3, Virtual Private Networks for voice may also be supported using PSTN switches or multiplexers as access vehicles (STM switches 210 in the instant example) and utilizing the IP network 205 as backbone, as was previously described. Advantageously, the instant embodiment for establishing Virtual Private Networks for voice is achieved using network routers 220 with simple priority mechanisms. That is, signaling is not required between the Virtual Provisioning Server 230 and network routers 220 to establish and maintain the Virtual Private Networks. Rather, the Virtual Provisioning Server 230 uses aggregate capacity needed between a pair of gateways to perform virtual provisioning. The Packet Circuit Gateways 215, in conjunction with the Signaling Gateways 250, are utilized to control the acceptance or rejection of new calls from each Virtual Private Network customer utilizing an acceptance/rejection algorithm residing in the Virtual Provisioning Server 230.

Figure 4:
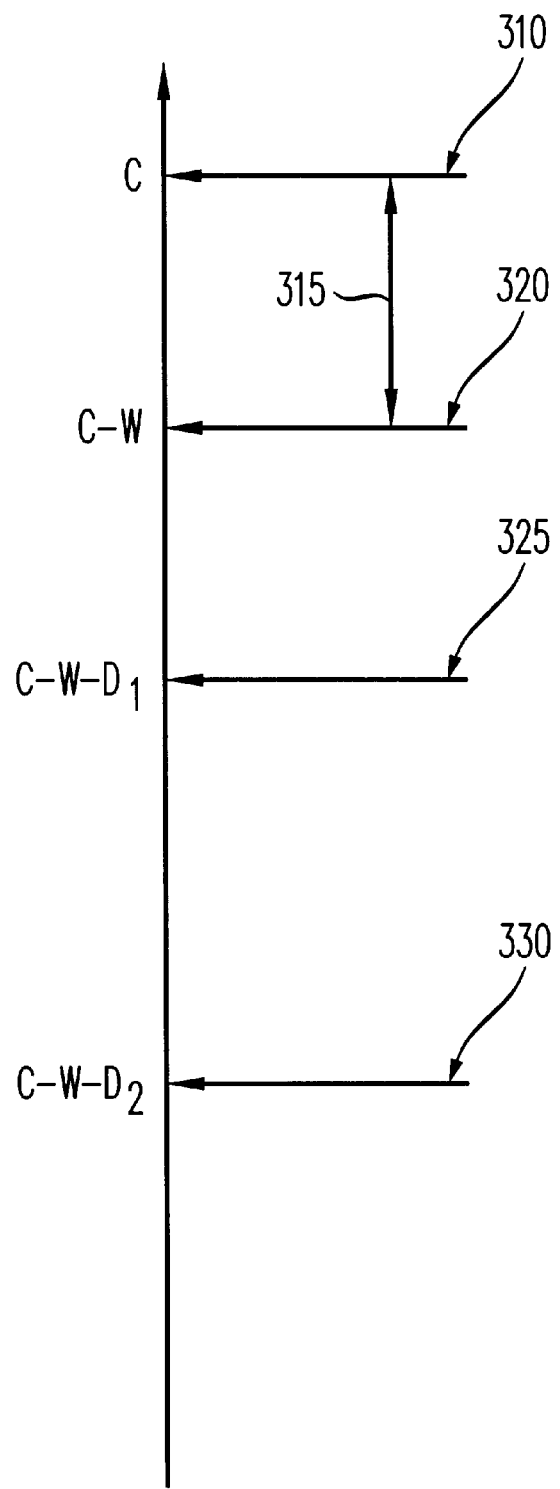
FIG. 4 is a diagram illustrating the bandwidth allocation structure associated with an exemplary embodiment of the present invention.
Figure 5:
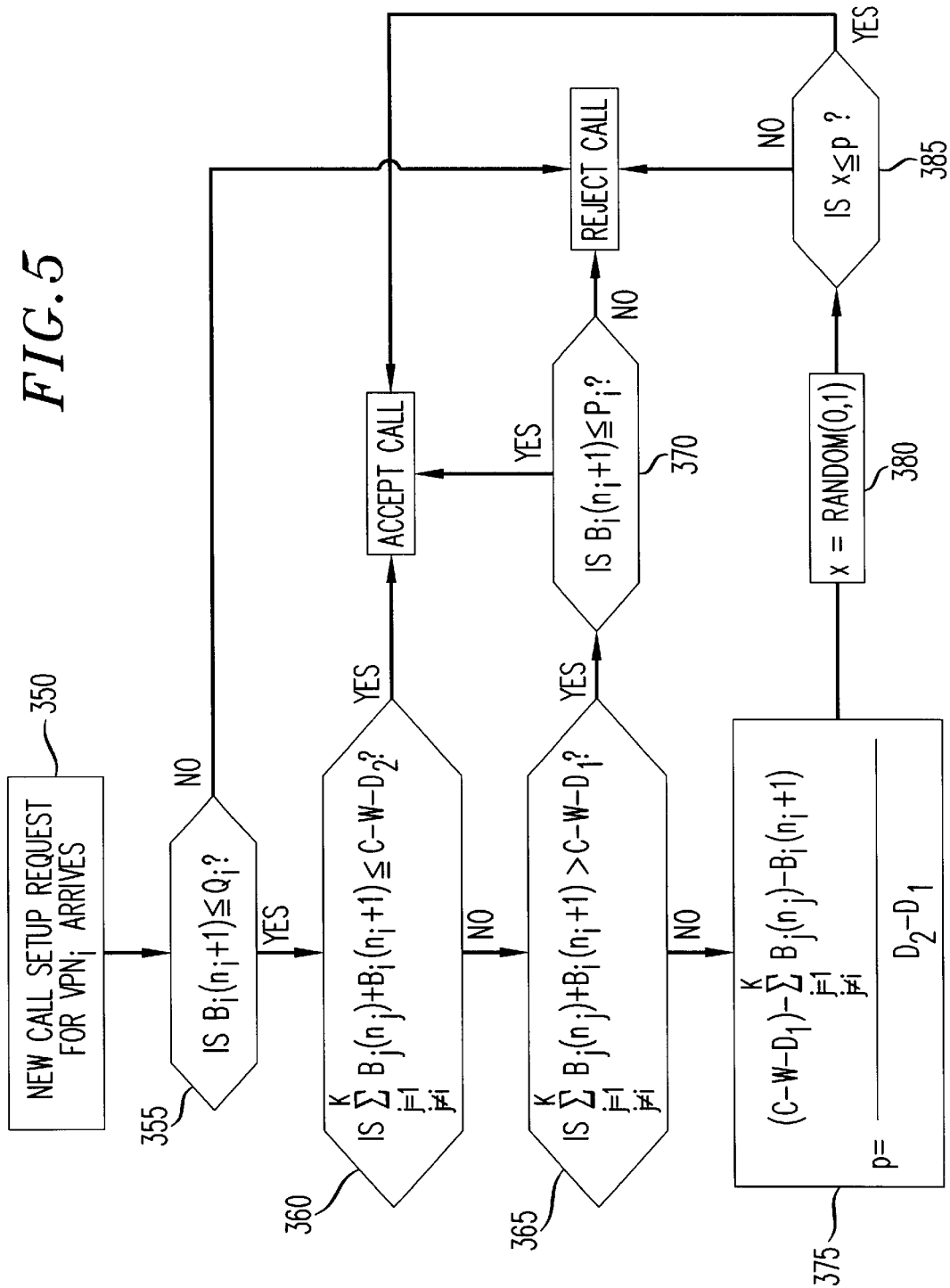
FIG. 5 is a flow diagram illustrating one exemplary embodiment of an algorithm for call admission control for a plurality of Virtual Private Networks sharing a link within a common network, in accordance with the present invention.

FIGS. 4 and 5 illustrate and define an exemplary algorithm for performance of the acceptance or rejection of new calls over a Virtual Private Network established between Packet Circuit Gateways 215, in accordance with the present invention. In conjunction with the accompanying description, the following definitions apply:

C=The total link bandwidth 310,

W=The minimum bandwidth always available for combined traffic supported using Available Bit Rate (ABR) or best effort data service 315, C−W=The total bandwidth available for call admission control purposes 320, C−W−$D_1$=An upper threshold for call admission control purpose 325, C−W−$D_2$=A lower threshold for call admission control purpose 330, $B_i(n_i)$=Bandwidth needed to support $n_i$ connections for $VPN_i$ with a specified Quality of Service, $P_i$=Minimum bandwidth contracted for $VPN_i$, $Q_i$=Maximum bandwidth contracted for $VPN_i$, and K=Number of Virtual Private Networks with Quality of Service guarantees sharing the link in consideration.

When a new call set-up request for $VPN_i$ arrives at the Signaling Gateway 250, then the exemplary algorithm associated with FIG. 5 is performed to determine whether to accept or reject the new call, in accordance with step 350. The bandwidth utilized by K Virtual Private Networks ($VPN_i$; i=1,2,3, . . . K) is monitored at the Signaling Gateway 250. Referring to step 355, when the $VPN_i$ bandwidth necessary to support an additional call exceeds the maximum bandwidth allocation ($Q_i$), the requested new call is rejected. However, when the $VPN_i$ bandwidth necessary to support an additional call does not exceed the maximum bandwidth allocation ($Q_i$), then step 360 is performed. In accordance with step 360, if the $VPN_i$ bandwidth usage would be between the range of zero to (C−W−$D_2$) after connecting the new call, then the new call is accepted. However, if $VPN_i$ bandwidth usage would be greater than (C−W−$D_2$) after connecting the new call, then step 365 is performed. In accordance with step 365, if $VPN_i$ bandwidth usage would be between the range from (C−W−$D_1$) to (C−V), a new call set-up request for $VPN_i$ is accepted only if the bandwidth usage by $VPN_i$ has not exceeded its minimum allocation, $P_i$, otherwise the call is rejected, in accordance with step 370. If however, the $VPN_i$ bandwidth usage is between the range of (C−W−$D_2$) to (C−W−$D_1$), a new call set-up request for $VPN_i$ is accepted or rejected probabilistically based on a sliding scale algorithm in accordance with step 375. Let q=(1−p) denote the ratio of bandwidth usage in excess of (C−W−$D_2$) over ($D_2$−$D_1$). A random number x is generated at the Signaling Gateway 250 to support the probabilistically based algorithm, in accordance with step 380. If the value of x is less than or equal to probability p, then the new call is accepted, in accordance with step 385. For a call that traverses multiple links between its source and destination PCGs, the algorithm of FIG. 4 and FIG. 5 is repeated for each path link used to establish the call. The call is connected between the source and destination PCGs only if the algorithm yields a positive determination (to accept the call) for each link in the path.

During implementation of the exemplary algorithm of FIG. 5, the bandwidth utilization data, $B_i(n_i)$, as a function of the number, $n_i$, for calls over $VPN_i$ is utilized. If the calls or connections are constant bit rate, then $B_i(n_i)$ is a simple linear function of $n_i$. However, if the calls or connections are variable bit rate by nature or by design, for example—voice with silence elimination, on/off data sources, etc., then $B_i(n_i)$ is typically a non-linear function of $n_i$. The non-linear nature of $B_i(n_i)$ is due to the statistical multiplexing of randomly varying variable bit rate sources, as is well known in the art. For example, the specific nature of a $B_i(n_i)$ function, in the context of packet voice multiplexing, is detailed in a publication by K. Sriram and Y. T. Wang entitled "Voice Over ATM Using AAL2 and Bit Dropping: Performance and Call Admission Control," Proceedings of the IEEE ATM Workshop, May 1998, pp. 215–224, which is incorporated herein by reference.

Prior reference to the Virtual Provisioning Server (VPS) is described in the context of an IP network which includes multiple interconnected Open Shortest Path First (OSPF) domains. The present invention may also be implemented within an IP network comprised of multiple interconnected administrative areas, wherein each administrative area is comprised of multiple OSPF domains. Typically, each administrative area is an IP network belonging to an individual internet service provider or carrier, although such a configuration is not required. Such an embodiment of the present invention may be implemented with each administrative area having one gateway VPS. Each respective VPS may be co-located with the gateway router for that respective administrative area, although co-location is not a required aspect of the embodiment. Each pair of respective gateway VPSs determines the capacity requirements between their respective gateway routers. Further, each gateway VPS provides the necessary bandwidth capacity information between pairs of neighboring administrative areas to the VPSs located in each of the OSPF domains within its administrative area. Thus, the signaling gateways anywhere in the larger IP network are adequately provided with the necessary information for admission/denial of calls, including those that originate in one administrative area and terminate in another.

Numerous modifications and alternative embodiments of the invention will be apparent to those skilled in the art in view of the foregoing description. For example, although the present invention has been described in the context of a single Virtual Provisioning Server utilized to service an entire IP network and control all Signaling Gateways within that network, it is also equally applicable for an embodiment of the present invention operable for multi-domain operation. That is, for those instances when call routing is made from a first telephony gateway source connected to a first IP domain and the destination is a second telephony gateway connected through another IP domain, the call processing involves intra-domain routing to the gateway router in the first domain, routing among gateway routers in intervening domains, and intra-domain routing from the gateway router to the telephony gateway in the last domain. Protocols such as Open Shortest Path First (OSPF) determine routing in a domain while a Border Gateway Protocol (BGP) is used for inter-domain routing between gateway domains. In such an embodiment of the present invention, a plurality of Virtual Provisioning Servers are utilized, one for each IP domain. Each Virtual Provisioning Server manages the virtual provisioning of routers within its respective domain, including Gateway Border Routers. Additionally, each pair of interfacing Virtual Provisioning Servers determines the capacity requirements between their respective pair of interfacing Gateway Border Routers. As was true for the single domain embodiment of the present invention, admission/denial control at the originating and terminating Packet Circuit Gateways is enabled without signaling the incorporated routers directly. In the multi-domain embodiment, this capability is attributable to shared knowledge of intra-domain and inter-domain routing protocols among the interfaced Virtual Provisioning Servers and also due to the static nature of router algorithm weights.

Additionally, the previous description is applicable for embodiments of the present invention in which service guarantees are provided without adding signaling mechanisms between routers and the associated Virtual Provisioning Server. However, the present invention would be equally applicable for those instances in which the Virtual Provisioning Server is operable to directly signal the network routers; although such an embodiment would be more accurately described as having a Server in which the provisioning is more real than virtual (since the provisioning is controlled at the routers instead of at the corresponding originating and terminating gateways). This alternative embodiment utilizes state exchange protocols in Open Shortest Path First (OSPF) and Border Gateway Protocol (BGP), which are extended to provide dynamic topology and capacity information.

The present invention may also be used in evolving IP networks in which the well-known Multi-Protocol Label Switching (MPLS) is utilized at the network IP routers. In an MPLS based IP network, the Virtual Provisioning Server maintains a knowledge base of possible multiple paths between source-destination pairs of Packet Circuit Gateway edge devices. The Signaling Gateways receive information from the Virtual Provisioning Server about alternative paths and associated capacities between PCG pairs, and admits a new voice call request if capacity is available over any of the available paths, otherwise, the call request is rejected.

Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for providing a Quality of Service guarantee for delay sensitive traffic conveyed over a path within an Internet Protocol (IP) network having a virtual provisioning server, a source edge device providing an interface for launching said delay sensitive traffic within said IP network, said method comprising the steps of:

receiving, at a signaling gateway, a value representing a bandwidth capacity for said path;

receiving at said signaling gateway, a request to establish an additional delay sensitive traffic component over said path;

comparing, at said signaling gateway, said value representing said bandwidth capacity for said path with a total bandwidth needed if said additional delay sensitive traffic component is established over said path;

identifying, at said signaling gateway, at least one of a plurality of paths within said IP network as having a most limiting available bandwidth capacity, wherein the identified path has sufficient available bandwidth capacity to handle said additional delay sensitive traffic component; and limiting said quantity of said delay sensitive traffic launched from said source edge device to less than or equal to said most limiting available bandwidth capacity.

2. The method in accordance with claim 1 wherein said value representing said bandwidth capacity for said path is transmitted from said virtual provisioning server to said signaling gateway.

3. The method in accordance with claim 1 wherein said request to establish said additional delay sensitive traffic component over said path is conveyed from said source edge device.

4. The method in accordance with claim 3 wherein said source edge device is a packet circuit gateway.

5. The method in accordance with claim 1 further comprising the step of conveying said signal denying said request to establish said additional delay sensitive traffic component from said signaling gateway to said source edge device.

6. The method in accordance with claim 1 further comprising the steps of:

generating, at said signaling gateway, a signal authorizing said request to establish said additional delay sensitive traffic component if said total bandwidth needed is less than or equal to said value representing said bandwidth capacity for said path; and conveying said signal authorizing said request to establish said additional delay sensitive traffic component from said signaling gateway to said source edge device.

7. The method in accordance with claim 1, further comprising:

generating, at said signaling gateway, a signal denying said request to establish said additional delay sensitive traffic component if said total bandwidth needed is greater than said value representing said bandwidth capacity for said path.

8. A method for providing a Quality of Service guarantee for real-time voice transmission traffic conveyed between a source Packet Circuit Gateway and a destination Packet Circuit Gateway over an Internet Protocol (IP) network having a plurality of routers, said source Packet Circuit Gateway providing an interface for launching said real-time voice transmission traffic within said IP network over an IP network path, said method comprising the steps of:

partitioning, from a bandwidth capacity associated with said IP network path, a first provisioned bandwidth capacity for a first Virtual Private Network (VPN), said VPN contracted for said real-time voice transmission traffic conveyed between said source Packet Circuit Gateway and said destination Packet Circuit Gateway;

maintaining, at a Signaling Gateway, a value representing said first provisioned bandwidth capacity for said first VPN;

receiving, at said Signaling Gateway, a request from said source Packet Circuit Gateway to establish a new call connection with said destination Packet Circuit Gateway over said first VPN, in addition to a plurality of presently established call connections;

comparing, at said Signaling Gateway, said value representing said first provisioned bandwidth capacity for said first VPN with a required first VPN bandwidth capacity should said new call connection be established; and transmitting, from said Signaling Gateway, a signal denying said request to establish said new call connection if said required first VPN bandwidth capacity should said new call connection be established is greater than said value representing said first provisioned bandwidth capacity for said first VPN.

9. The method in accordance with claim 8 further comprising the step of:

transmitting, from said Signaling Gateway, a signal authorizing said request to establish said new call connection if said required first VPN bandwidth capacity should said new call connection be established is less than or equal to said value representing said first provisioned bandwidth capacity for said first VPN.

10. The method in accordance with claim 8 wherein a Virtual Provisioning Server is utilized to provide said Signaling Gateway with said value representing said first provisioned bandwidth capacity for said first VPN.

11. The method in accordance with claim 10 wherein said Virtual Provisioning Server is adapted to maintain a plurality of Virtual Private Networks over said IP network path.

12. The method in accordance with claim 8 wherein said Quality of Service guarantee is established by maintaining delay of said real-time voice transmission traffic conveyed between said source Packet Circuit Gateway and said destination Packet Circuit Gateway below a guaranteed threshold value.

13. The method in accordance with claim 8 wherein said Quality of Service guarantee is established by maintaining jitter of said real-time voice transmission traffic conveyed between said source Packet Circuit Gateway and said destination Packet Circuit Gateway below a guaranteed threshold value.

14. The method in accordance with claim 8 wherein a circuit network switch is utilized to supply and accept said plurality of presently established call connections and said new call connection from said source Packet Circuit Gateway.

15. The method in accordance with claim 14 wherein said circuit network switch is a Synchronous Transfer Mode (STM) switch.

16. The method in accordance with claim 8 wherein at least one of said plurality of routers is operable to support Multi-Protocol Label Switching.

17. The method in accordance with claim 10 wherein a plurality of Multi-Protocol Label Switching (MPLS) routers is utilized to establish a plurality of paths between said source Packet Circuit Gateway and said destination Packet Circuit Gateway.

18. The method in accordance with claim 17 wherein said Virtual Provisioning Server is further operable to provide said Signaling Gateway with a plurality of values representing bandwidth capacities for each of said plurality of paths between said source Packet Circuit Gateway and said destination Packet Circuit Gateway.

19. The method in accordance with claim 10 wherein a plurality of Virtual Provisioning Servers are utilized to service a corresponding plurality of Open Shortest Path First domains.

20. The method in accordance with claim 10 wherein a plurality of Virtual Provisioning Servers are utilized to service a corresponding plurality of multiple administrative areas.

* * * * *